April 5, 1960     R. H. DAVIES     2,931,378

VENTED CHAMBER, FLUID PRESSURE ACTUATED VALVE

Filed Jan. 14, 1955

INVENTOR.
ROBERT H. DAVIES
BY
Oberlin + Limbach
ATTORNEYS.

2,931,378
VENTED CHAMBER, FLUID PRESSURE ACTUATED VALVE

Robert H. Davies, Aurora, Ohio, assignor to Parker-Hannifin Corporation, a corporation of Ohio Application January 14, 1955, Serial No. 481,835

1 Claim. (Cl. 137—220)

The present invention relates generally as indicated to a vented chamber, fluid pressure actuated valve, and more particularly to a unique form of valve which is characterized in that it opens, as does a conventional check valve, to permit flow of fluid in one direction therethrough under the influence of fluid under pressure in the inlet; but closes, contrary to a conventional check valve, under the influence of fluid under suction or negative pressure in the outlet.

This invention is also concerned with an improved fluid circuit such as an aircraft fuel system, for example, which by reason of installation of this new valve therein provides a simplified, automatic control of the functions of the circuit.

Hitherto, the multi-tank aircraft fuel systems, it is a known practice to employ a conventional type spring-seated check valve between each fuel tank and the engine-driven fuel pump for unidirectional flow of fuel under pressure developed by booster pumps associated with the respective tanks to the pump without reverse flow into an empty or reserve tank; and, therefore, in order to prevent drawing of air into the pump intake line from an empty tank when the fuel pump is drawing fuel under suction or negative pressure from another tank having an inoperative booster pump therein, the check valve associated with the empty tank must be in closed position in opposition to such negative pressure. Accordingly, a conventional type check valve when installed in such fuel system must be equipped with a spring capable of resisting opening under the influence of a 15 to 20 p.s.i. pressure differential between its inlet and outlet.

As a consequence, in the normal operation of the system described above, there will be a large pressure drop through the conventional type check valve whereby, when the line loss is included, fuel will be delivered to the fuel pump intake only at a pressure of 10 p.s.i. or less even though the booster pump delivery is 30 p.s.i., for example.

With the foregoing in mind, it is a general object of this invention to provide a valve which has a very low pressure drop, that is, the movable valve member therein need be held closed only by a force slightly greater than the maximum static head of the fluid tending to open the same, whereupon, in the fuel system herein described, when said valve is open, fuel will be delivered to the intake port of the engine-driven fuel pump at a maximum pressure with reference to the delivery pressure of the booster pump.

It is another object of this invention to provide a valve of the character indicated which, as a result of its low pressure drop and exposure of only one side of the valve member therein to the flowing fluid, affords a free flow of fluid therethrough even when the pressure differential drops to a value less than required to initially open the valve.

Another object of this invention is to provide a valve which is automatically closed in response to suction or negative pressure on the outlet side thereof.

Another object of this invention is to provide a valve which is reversible, that is to say that either one of the two ports thereof may be an inlet and the other one an outlet without affecting its desired function as a valve which is opened by a predetermined pressure of fluid in the inlet and which is closed by suction or negative pressure of fluid in the outlet.

It is another object of this invention to provide a valve having only one side of its movable valve member exposed to the fluid adapted to flow through the valve, and the opposite side exposed to the atmosphere via a vented chamber isolated from the fluid flow passage of the valve.

Another object of this invention is to provide a "straight" valve which has ports at its respective ends and an intermediate chamber-defining valve assembly around which fluid is adapted to flow from one port to the other without access to such chamber.

Another object of this invention is to provide a fluid system or circuit (not necessarily an aircraft fuel system) which has a low pressure drop with reference to normal unidirectional flow of fluid therein under the influence of pressure greater than atmospheric pressure but yet is automatically closed to continued flow under suction or negative pressure conditions.

Other objects and advantages of the present invention will be come apparent as the following description proceeds.

To the accomplishment of the foregoing and related ends, the invention, then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
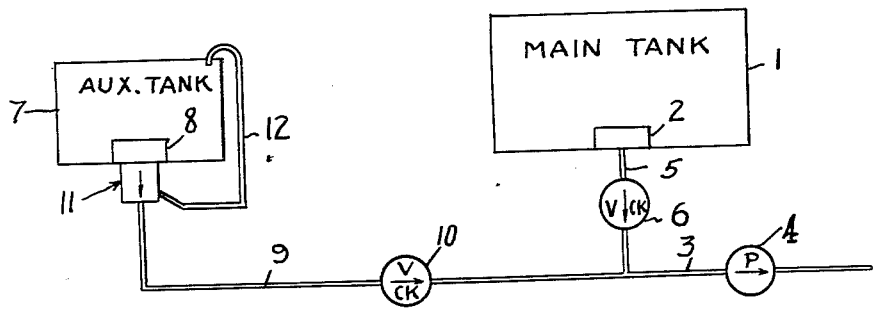
Fig. 1 is a schematic diagram of a portion of a multi-tank aircraft fuel system having the present valve installed therein.

Referring now more particularly to the drawing and first to Fig. 1 thereof, there is shown a main fuel tank 1 having a submerged booster pump 2 therein effective to deliver fuel under pressure to the intake line 3 of the engine-driven fuel pump 4 by way of line 5 and conventional check valve 6, and an auxiliary fuel tank 7 having a submerged booster pump 8 therein similarly effective to deliver fuel under pressure to line 3 via line 9 and conventional check valve 10.

The submerged booster pumps 2 and 8 are, as well known in the art, of the centrifugal type, each composed of a casing having an electric motor-driven impeller therein; said casing usually having a screened inlet port to strain the fuel and thus protect the engine-driven fuel pump 4 from foreign matter.

Insofar as the persent invention is concerned, said booster pumps 2 and 8 need not be mounted within the respective tanks 1 and 7 but may be of the type adapted to be dependingly secured to the bottom thereof. In any event, the booster pumps 2 and 8, whether submerged in the tanks or mounted therebeneath, prevent fuel system failure resulting from vapor lock at high altitude, and in addition may be operated as emergency fuel pumps in high-pressure systems.

In some instances, booster pumps are operated as primers and pressure pumps when starting the engine, and also can be used to transfer fuel between tanks at any altitude. However, the present invention is not concerned with all of the possible uses of booster pumps and other details of aircraft fuel systems, and therefore, tank-interconnecting lines, fuel selector valves, refueling connections, and other components have been omitted from Fig. 1 for sake of clarity and simplification.

When one of the booster pumps 2 or 8 is operating, fuel is drawn thereinto at high velocity and consequent reduction in pressure, causing formation of vapor which is thrown outward by the impeller and escapes to the top of the tank in the form of bubbles. The liquid fuel is then discharged under pressure by the booster pump 2 or 8 into the intake port of fuel pump 4. Because the booster pumps 2 and 8 are of the centrifugal type as aforesaid, fuel may be drawn through them when not in operation.

Under normal operating conditions, booster pump 8 may be used to deliver fuel from auxiliary tank 7 through line 9 and check valve 10 to the fuel pump intake line 3, the fuel pressure in line 3 being effective to close check valve 6. Likewise, booster pump 2 may be operated to deliver fuel from main tank 1 through line 5 and check valve 6 to the fuel pump intake line 3, the check valve 10 then being closed by the fuel pressure in line 3.

However, the fuel system, thus far described, is not foolproof in that, should the booster pump 2 in the main fuel tank 1 be inoperative and should auxiliary fuel tank 7 be empty, the engine-driven fuel pump 4 will open check valve 6 and draw fuel from main tank 1 through the booster pump 2, but at the same time, the partial vacuum or negative pressure in lines 3 and 5 will open check valve 10, and thus draw air into said pump 4, unless said check valve 10 is spring-seated with a force to resist opening at a pressure differential of 15–20 p.s.i. In that event, the pressure drop is relatively high between tank 7 and pump 4 so that normal operation of booster pump 8 at 30 p.s.i., for example, will result in only a 5–10 p.s.i. fuel pressure at the intake port of pump 4.

Now, in order to prevent the drawing of air from the auxiliary tank 7 under the conditions above stated, the present improved valve 11 has been installed between the booster pump 8 and the conventional check valve 10, and as will more fully be explained herein, said valve 11 will open at low pressure to permit free flow of fluid therethrough and through the conventional check valve 10 to the intake line 3 of the fuel pump 4.

In this case, the check valve 10, as well as check valve 6, may have a low opening pressure of say 2–4 p.s.i. because, when tank 7 is empty and when booster pump 2 is inoperative, the special valve 11 immediately takes over and closes the fluid communication between line 9 and tank 7 due to any suction or negative pressure in lines 3, 5, and 9. Therefore, the closing of the auxiliary tank line 9 against suction is achieved without creation of a high pressure drop in said line; and, as a consequence, normal operation of booster pump 8 at 30 p.s.i. will result in delivery of a fuel pressure of 20–25 p.s.i. to the intake port of fuel pump 4.

Although the special valve 11 is here shown as mounted to the bottom of the auxiliary tank 7 in communication with the discharge port of the booster pump 8, it is to be understood that this valve 11 may be installed anywhere in the line 9 and in any position with the central axis of the ports thereof vertical, as shown, horizontal, or at any angle therebetween.

As shown in Fig. 1, said check valve 11 has a ventline 12 connected thereto leading into the auxiliary tank 7 above the level of the fuel therein. The reason for venting the valve 11 to the tank 7 instead of to the atmosphere is that, in the event of failure or rupture of the valve member in valve 11, the leaking fuel will be safely returned into the tank 7 instead of being discharged into the airplane or onto the ground and thus creating a fire hazard.

Figure 2:
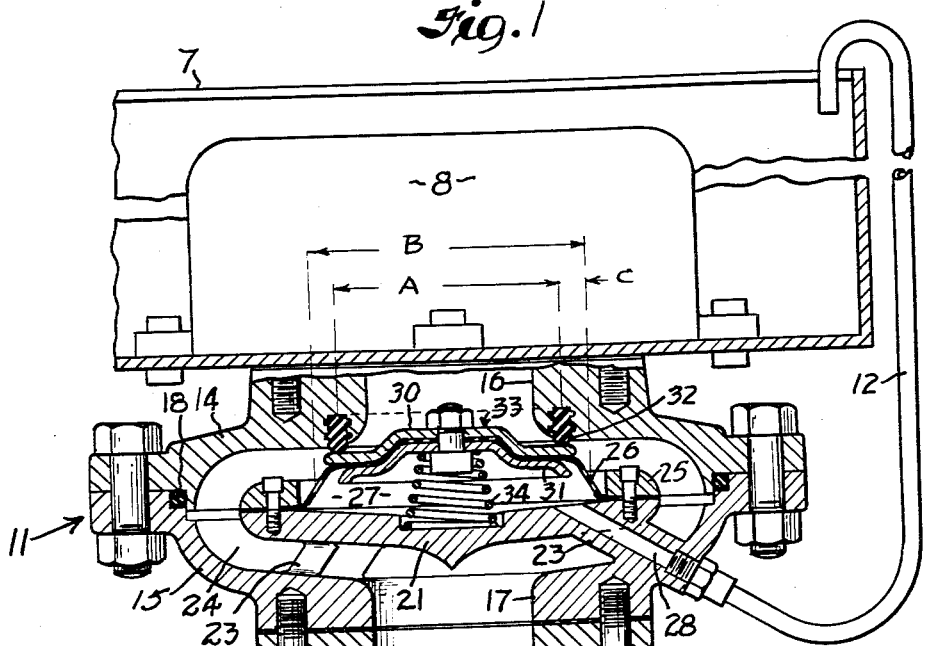
Fig. 2 is a central vertical cross-section view of said valve, the movable valve member therein being shown in passage-closing position.

Referring now to Fig. 2, which is a central vertical cross-section view of a preferred form of the valve 11, said valve comprises a two-part body 14—15 providing ports 16—17 at its respective ends, said parts being bolted, screwed, or otherwise secured together in fluid-tight manner with a rubber-like O-ring 18 or equivalent packing or gasket therebetween.

The body parts 14 and 15 surrounding the ports 16 and 17 are suitably formed for connection in the fuel system as shown, for example, in Fig. 1, with the part 14 bolted to the tank 7 in communication with the discharge port of the booster pump 8 and the other body part 15 having bolted or otherwise secured thereto a tube-fitting adaptor 19 to which the tube 9 is connected in known manner.

The body part 15 is here shown as integrally formed with a partition 21 supported by legs 23 to form an annular passage 24 therearound which affords fluid communication between the ports 16 and 17.

Clamped to said partition 21 by ring 25 is the peripheral portion of a flexible diaphragm 26 which forms with said partition 21 a chamber 27 which is adapted to be vented to the atmosphere or into the tank 7 by way of a passage 28 through said partition 21 and one of the legs 23 to which vent line 12 is adapted to be connected.

Said flexible diaphragm 26 carries a valve unit comprising washers 30 and 31 held together by bolt and nut as shown, to clamp the central portion of said diaphragm 26 therebetween. The body part 14 carries a valve seat 32 which is in the form of a rubber-like ring secured in place by molding or otherwise, and obviously said seat 32 or its equivalent thereof may be carried by the valve plate 30 for engaging body part 14 around port 16.

Compressed between said partition 21 and the movable valve member 33 (consisting of the flexible diaphragm 26 and valve unit above described) is a spring 34 which preferably is selected to exert a force on the valve member just sufficient to overcome the maximum static head of the fuel in the auxiliary tank 7.

As is now apparent, when the booster pump 8 in the auxiliary tank 7 is not in operation, the valve member 33 will engage seat 32 under the influence of spring 34 and will thus close fluid communication between ports 16 and 17. When said booster pump 8 is started, said valve member 33 will be forced away from said seat 32 as soon as the pressure of the fuel in port 16 and acting on the area of diameter "A" overbalances the opposing force exerted by spring 34, whereupon fuel will freely flow around ring 25 and partition 21 through the annular passage 24 to the outlet port 17.

Because the pressure of the fluid flowing through the passage 24 and the outlet port 17 has no access to the back side of valve member 33, the chamber 27 being isolated from the fluid flow passages of the valve, the back pressure is ineffective in tending to seat the valve member 33 as is the case in conventional check valves. Moreover, as the fluid flows from the inlet 16 to the outlet 17, the pressure thereof acts on the entire effective area of diameter "B" of the valve member 33 tending to keep the valve member 33 in open position even when the pressure is less than that required to initially unseat said valve member 33.

Thus, the valve 11 provides for free flow of fluid with minimum pressure drop so that the delivery pressure of booster pump 8 may be a minimum with respect to the desired pressure of the fluid at the intake port of the fuel pump 4.

Assuming now that the booster pump 2 in the main tank 1 is inoperative and that the auxiliary tank 7 is empty with its booster pump 8 shut off, suction or negative pressure in line 9 caused by drawing of fuel by pump 4 from tank 1 and acting on the forward side of the valve member 33 on the annular area of radial width "C" creates a pressure differential such that the overbalancing effect of atmospheric pressure in chamber 27 on area "B" plus the force of spring 34 is effective to move said valve member 33 to seated position.

As is now clear, the low pressure opening of valve 11 and suction closing thereof is achieved without creating the great pressure drop through the valve as is necessary in conventional check valves.

Having thus described one embodiment of the present invention, it will be apparent to those skilled in the art that the valve 11 herein is reversible, end-for-end, in that port 17 may as well be the inlet port and port 16 the outlet port; and, therefore, when the valve is installed in the fuel system, it is immaterial which one of the two ports 16 or 17 is connected to the booster pump 8.

When said valve 11 is installed in reversed position, fluid under pressure in port 17 will act on the annular area of radial width "C" tending to unseat said valve member 33, and such unseating will occur as soon as the unseating force exceeds the resisting force of spring 34. Similarly, when the fluid in the outlet port 16 is under suction or negative pressure, the force exerted by spring 34 and the atmospheric pressure in chamber 27 will overbalance the negative force acting on the other side of said valve member on area of diameter "A" (including perhaps a portion of the annular area of radial width "C"), and thus, the valve member 33 will be urged to seated position.

In this reversed installation of the valve 11, again the pressure of the flowing fluid tends to keep the valve member 33 in open position because such pressure acts only on one side of valve member 33 while the opposite side is constantly and exclusively exposed to the chamber 27 which is isolated from the fluid flow passages of the valve 11.

Insofar as the fluid circuit is concerned, the installation of the special valve 11 therein provides a simple expedient for achieving of automatic control of the flow of fluid therein without complicated electrically or mechanically operated shut-off valves or the like or without using a strong spring-seated check valve which correspondingly increases the pressure drop in the system and thus reduces the efficiency thereof.

Figure 3:
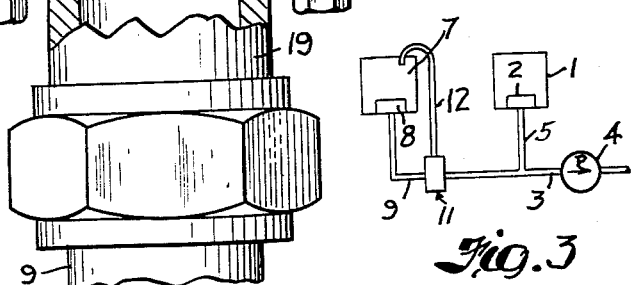
Figs. 3 and 4 are schematic diagrams illustrating other uses to which the present valve may be put.
Figure 4:
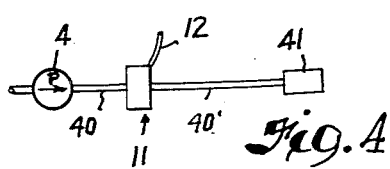

The fluid circuit of Fig. 1 is to be regarded merely as illustrative of but one of the many uses to which the valve 11 herein may be put; and, in order to further illustrate the efficacy and utility thereof, other examples of fluid circuits are given in Figs. 3 and 4.

The Fig. 3 fluid circuit is essentially the same as that in Fig. 1 except for the omission of the conventional check valves 6 and 10. Thus, said Fig. 3 fluid circuit comprises tanks 1 and 7 with booster pumps 2 and 8 therein, fuel delivery lines 5 and 9 leading from the respective tanks to the fuel intake line 3 of the engine-driven fuel pump 4, and the special valve 11 installed in the line 9 and having a vent line 12 which is vented into tank 7 (or tank 1, if desired).

Normally, the booster pumps 2 and 8 are simultaneously operated to supply fuel to the intake port of the pump 4, the valve 11 being held open by fuel under pressure acting on the area of diameter "A" and on the annular area of radial width "C" of the movable valve member 33 therein, without pressure drop other than that due to the particular configuration of the fluid flow passage through the valve, such pressure drop not being appreciably greater than a corresponding length of the line 9.

Now, if the tank 7 is being emptied faster than tank 1, or has less fuel therein thereby creating an unbalance of fuel load as in the case of wing tanks, the booster pump 8 may be shut off, whereupon the fuel delivered under pressure by booster pump 2 will act on the annular area of radial width "C" of the valve member 33 in valve 11 (or on the area of diameter "A," when the valve 11 is installed in a position reversed from Fig. 2) to unseat said valve member 33, and thus transfer fuel from tank 1 into tank 7. The valve 11 in the Fig. 3 circuit also permits gravity feed of fuel under negative pressure from tank 1 to pump 4 when booster pump 2 is inoperative and when tank 7 is empty, the valve 11 automatically closing under such conditions of operation, as already described.

Now, with reference to the Fig. 4 fluid circuit, the valve 11 is there shown installed in the fuel line 40 leading from the discharge port of pump 4 to the fuel atomizing nozzle 41, again the chamber 27 of said valve 11 being vented as by vent line 12 to one of the fuel tanks or elsewhere so that back pressure of fluid in the outlet side of valve 11 is ineffective to tend to seat the valve member 33 therein. Assuming that the fuel pressure at nozzle 41 must be 50 p.s.i. in order to effect proper atomization, then all that it is necessary to do is to employ a spring 34 in valve 11 which permits opening of valve member 33 when the fluid pressure on the inlet side thereof is, say, 52 p.s.i. Accordingly, the fluid pressure at the outlet of pump 4 need be only, say, about 55 p.s.i. or less, because once the valve 11 is opened, the pressure drop is negligible, viz. the line loss in pipe 40 and in the fluid passage through valve 11.

Contrariwise, if a conventional check valve were employed in Fig. 4 with a heavy spring as aforesaid, then the fluid pressure at the outlet of pump 4 would have to be in excess of 100 p.s.i. in order to take care of the line loss, and to maintain a 52 p.s.i. pressure differential on opposite sides of the movable check valve member. Thus, the pump 4 would have to discharge fluid at a pressure in excess of 100 p.s.i. in order to provide the proper fluid atomizing pressure of 50 p.s.i. at the nozzle 41.

In valve 11, the pressure differential for opening the valve and for maintaining the valve open is that between the inlet fluid pressure and the atmospheric pressure in chamber 27, whereas in a conventional check valve, the pressure differential for opening the valve and for maintaining it open is that between the inlet fluid pressure and the outlet fluid pressure. With that distinction of the valve 11 herein from a conventional check valve in mind, it is at once evident that the pressure drop through said valve 11 will be very small, since only the configuration of the fluid flow passage contributes thereto. By appropriate streamlining of the fluid flow passage, the pressure drop of fluid flowing therethrough will not be appreciably greater than when the fluid flows through a corresponding length of straight tubing of the same cross-section area.

The figures given herein are to be regarded merely exemplary in order to emphasize the unique features of the valve 11 herein and of the fluid systems in which said valve is adapted to be installed.

Other modes of applying the principle of the invention may be employed, change being made as regards the details described, provided the features stated in any of the following claims, or the equivalent of such, be employed.

I therefore particularly point out and distinctly claim as my invention:

A valve of the character described comprising a body including body parts secured together and defining a generally straight passage therethrough terminating in inlet and outlet ports at its respective ends and including a seat between its ends; one body part being integrally formed with a partition and supporting legs around which partition and between which legs fluid is adapted to flow from said inlet port to said outlet port via said seat; and a valve member supported in said body for movement out of and into engagement with said seat between passage opening and passage closing positions and forming with said partition the movable wall of a chamber of which one side is exposed to the atmosphere through an opening extending through said one body part, through one supporting leg, and through said partition, and the opposite side of which, when said valve member is in passage closing position in engagement with said seat, is exposed to the pressure of fluid in said inlet port on an area less than that of such one side and to the pressure of fluid in said outlet port on an area also less than that of such one side whereby said valve member is moved to passage closing and opening positions respectively in response to negative fluid pressure in the outlet port and to positive fluid pressure in the inlet port, said valve member comprising a laterally flexible diaphragm which has a central portion movable to position respectively away from and toward said seat for opening and closing fluid communication between said inlet and outlet ports, and means separate of said body parts for clamping the peripheral portion of said diaphragm to the peripheral portion of said partition to thus define such vented chamber between said partition and the central portion of said diaphragm.

References Cited in the file of this patent

UNITED STATES PATENTS

| | | |
|---|---|---|
| 1,302,538 | Gulick | May 6, 1919 |
| 1,563,378 | Knauss | Dec. 1, 1925 |
| 1,670,318 | Shaff | May 22, 1928 |
| 2,209,856 | Smith et al. | July 30, 1940 |
| 2,437,187 | Eshbaugh | Mar. 2, 1948 |
| 2,516,150 | Samiran | July 25, 1950 |
| 2,519,968 | Jordan | Aug. 22, 1950 |
| 2,599,979 | Drane | June 10, 1952 |
| 2,631,832 | Hieger | Mar. 17, 1953 |
| 2,639,726 | Golob | May 26, 1953 |

FOREIGN PATENTS

| | | |
|---|---|---|
| 116,067 | Germany | Dec. 14, 1900 |
| 329,276 | Germany | Nov. 19, 1920 |
| 198,771 | Great Britain | June 8, 1923 |
| 931,031 | France | Sept. 15, 1947 |